United States Patent [19]

Droux et al.

[11] 4,271,522

[45] Jun. 2, 1981

[54] METHOD OF AND APPARATUS FOR DETERMINING ERRORS READ FROM A MAGNETIC RECORDING MEDIUM

[75] Inventors: M. Jacques Droux, Montfermeil, France; Claude R. Cardot, Lexington, Mass.

[73] Assignee: Compagnie Internationale pour l'Informatique CII-Honeywell Bull, Paris, France

[21] Appl. No.: 42,299

[22] Filed: May 25, 1979

[30] Foreign Application Priority Data

May 26, 1978 [FR] France ............................. 78 15764

[51] Int. Cl.³ ............................................ G06F 11/30
[52] U.S. Cl. .......................................... 371/57; 360/53
[58] Field of Search .................. 340/146.1 F, 312; 360/53; 364/200, 900; 371/57

[56] References Cited

U.S. PATENT DOCUMENTS

| | | | |
|---|---|---|---|
| 3,840,892 | 10/1974 | Hayashi ................................. | 360/53 |
| 3,956,736 | 5/1976 | Jacques et al. ...................... | 364/200 |
| 4,151,571 | 4/1979 | Cardot et al. ........................ | 360/77 |
| 4,152,695 | 5/1979 | Democrate et al. ........... | 340/146.1 F |
| 4,166,970 | 9/1979 | Cardot et al. ........................ | 318/561 |

FOREIGN PATENT DOCUMENTS 2346806 10/1977 France .

Primary Examiner—David H. Malzahn
Attorney, Agent, or Firm—Lowe, King, Price & Becker

[57] ABSTRACT

Errors in reading data with a magnetic head from reference zones on tracks at differing radii of a magnetic memory disc rotating at constant angular velocity are determined. Each track includes at least one reference zone including a plurality of initial cells. Each initial cell has magnetic flux variations which when read by the head result in a first waveform that includes undulations enabling the head to be properly servo controlled to a position over the center of the track and a further undulation that is distinguishable from the head positioning undulations because it has a larger amplitude. The initial cells are followed by plural binary bit representing data cells each having magnetic flux variations which when read by the head result in a second waveform including a data representing undulation that has approximately the same amplitude as the further undulations. The undulations are susceptible of having varying amplitudes as the head is positioned at different positions of the disc. In response to a detected peak amplitude of each further undulation of one reference zone a threshold is set for the further undulations of subsequently read first waveforms and for the address cells of the reference zone. An error in a cell is signalled if the set threshold is exceeded by the amplitude of undulations of the first and second waveforms at incorrect times.

30 Claims, 17 Drawing Figures

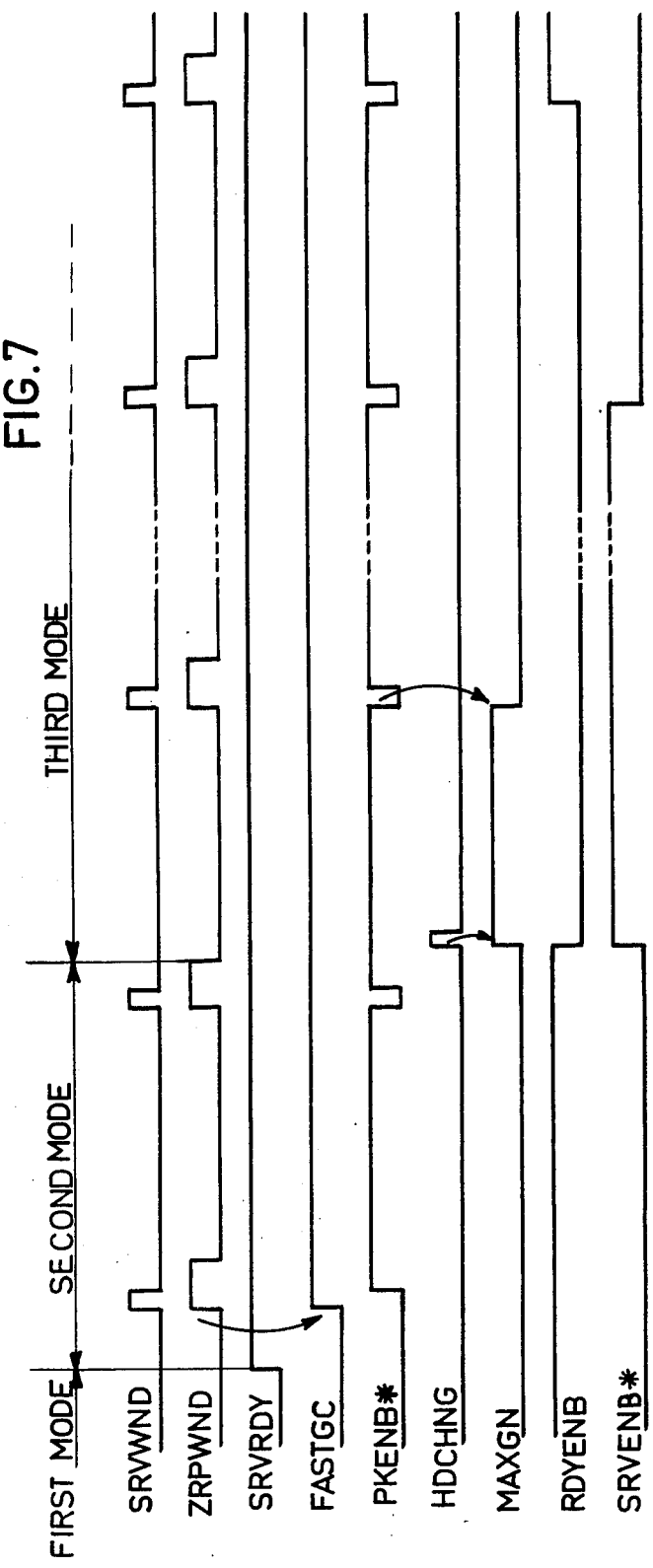
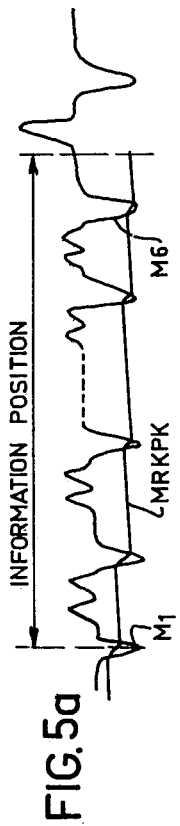

METHOD OF AND APPARATUS FOR DETERMINING ERRORS READ FROM A MAGNETIC RECORDING MEDIUM

FIELD OF THE INVENTION

The present invention relates generally to a method of and apparatus for reading signals from a magnetic memory, and more particularly, to a method of and apparatus for detecting errors read from reference zones in the memory.

BACKGROUND OF THE INVENTION

In data processing systems, magnetic disc memories are frequently used because they have a high storage capacity and require a relatively short time to access magnetic read/write heads to a data item contained anywhere on a disc after the head receives an instruction to access the data item from the data processing system.

Magnetic discs carry data on both faces of the disc. On each face, the data are arranged in concentric, circular record tracks, each having a width that does not exceed a few hundredths of a millimeter. The tracks are identified by assigning each of them a serial number j between 0 and $(N-1)$ (where j is a whole number and N is the number of tracks on each face). An address is a coded expression of a track serial number j. Typically, addresses and other data are recorded in binary codes. Only one reading head, i.e. reading transducer, is generally associated with each face of a disc, but each disc face is associated with one head, whereby two heads are associated with each disc.

A series of data items on a magnetic disc is recorded in each track as a succession of small magnetic domains (referred to as "elementary magnets") distributed along the entire track length. Each magnetic domain has a magnetic induction in a direction parallel to the disc surface, and successive domains have opposite magnetic senses or polarities.

The term "bit" designates a binary one or binary zero digit. A binary digit can be expressed as an analog or logic electric signal. An analog signal is defined as a signal having a voltage that varies continuously between two limits, one of which is generally positive and the other negative. A logic signal is capable of assuming only two values, referred to as a logic zero or a logic one value.

Memories having a relatively small storage capacity, containing only one or two discs, have track addresses recorded on one face of a disc so that a maximum amount of space is set aside for data to be processed by the data processing system. A relatively small amount of space on each face is set aside for reference zone addresses and magnetic flux variations that assist in servo-controlling the magnetic head associated with the face to a position on the face. The addresses and servo position control fluxes, frequently referred to as items of track locating data, are generally recorded in reference zones distributed over the entire disc surface. The number of reference zones is at least equal to the number of tracks, so that each track has at least one zone associated with it. Each zone includes an indexing indicia or first marker, enabling the beginning of the zone to be located, and which is followed by a series of individual cells, each of which contains one item of track locating data, i.e. servo position flux variations and address bits. The "beginning of a reference zone" is defined as a set of data items, usually the servo position data, in the zone which are initially read by the head when the face containing the reference zone moves past the head. Similarly, the "remainder of the zone" is defined as the set of data items, usually the zone address, in the zone which are read last by the head, i.e. after the set of items which are read first. Generally, the number of data items contained in the beginning of the zone is less than the number of data items contained in the remainder of the zone.

In each address bit cell of a magnetic disc, a binary bit is represented by a change in magnetization sense. The magnetization sense change occupies one of only two predetermined positions within the cell so the value of the item associated with the cell depends upon the position where the change occurs within the cell. Changes in magnetization sense must be repeated identically from one cell to the next, so that the magnetization sense of a first elementary magnet in each cell is always the same. Thereby, each address bit cell must include a second change in magnetization sense, referred to as an adjusting change.

In response to a magnetic reading head of a magnetic disc encountering a series of magnetization sense changes corresponding to a reference zone, the head derives a series of analog waveforms that are shaped into logic pulses by shaping circuits. The beginning of each reference zone is indicated by a special pulse, termed a first marker pulse.

Track locating data waveforms derived by the magnetic head are supplied to an apparatus that positions the head above the disc. The apparatus enables the head to be moved radially from track A, where the head is initially positioned, to track B, from which it is desired to read data. The head positioning apparatus also enables the magnetic head to be held exactly above the middle of track B during the time required to read data from track B. To enable data from track B to be read by the head as quickly as possible and with maximum accuracy, it is important for the time required to move the head from track A to track B be as short as possible and that the head be positioned above the center of track B as accurately as possible.

As the head moves over the track past the servo position data, the head derives a waveform having an average value, with undulations about the average value. As each cell is traversed, a properly positioned head derives a waveform having a pair of positive sinusoidal like equal amplitude waveforms that extend above the average value during the first and second third of each cell. The sinusoidal like waveforms are followed during the last third of the cell by a single negative pulse having an amplitude considerably greater than the amplitude of the sinusoidal waveforms. If the peak amplitudes of the sinusoidal waveforms during the first and second thirds are not substantially equal, an indication is derived that the head is not properly positioned over the center of the track. A servo system responds to the inequality to position the head properly. Typically, six cells of this type are provided at the beginning of each reference zone to properly position the head on the track.

The servo position cells are followed by the cells for the address bits of the reference zone. The properly positioned head reads each reference zone address cell bit as a waveform having the same average value as the waveform during the servo position cells. The waveform read from the first address cell always includes a pair of equal amplitude, sinusoidal like waveforms that extend above the average value. Thereafter, the cells represent the reference zone address bits. The waveform derived for each address bit cell includes two equal duration segments. Normally, one segment includes a relatively flat portion at the average value and the other segment includes a pulse, having a relatively large amplitude, approximately equal to the pulse amplitude in each of the servo position cells. The position of the pulse in each cell indicates whether the cell bit value is a binary zero or one. In a particular embodiment, pulses in the first and second halves of each cell respectively represent binary zero and one values. Because each cell must include a pair of opposite polarity magnetic domains, the pulse polarity for adjacent cells must be in opposite directions. For example, the pulses associated with even and odd numbered address cells are respectively in the negative and positive directions in the first or second half of each cell, so that binary ones in even and odd numbered cells are respectively represented as negative and positive pulses in the second half of the cells while binary zeros in the odd and even cells are respectively represented as positive and negative pulses in the first half of the cells.

To enable the head to be moved from track A to track B in the shortest possible time and to position the head properly over the center of track B, any analog waveform corresponding to any magnetization sense change in a reference zone must be detected with maximum accuracy. Hence, the head analog waveform only represents an item of servo position information or an address bit if the negative pulse during the last third of each initial cell or an undulation during the first or second half of an address cell reaches a certain threshold level. In prior art systems, the threshold is set at a relatively low, arbitrary value that represents only approximately 20–25% of the maximum amplitude which an analog waveform derived by the head is able to attain. This is because the amplitude of waveforms read from the head varies as a function of relative head and disc velocity, in turn a function of a number of variables, e.g. head positions on the disc. Generally, the waveform amplitude increases as the head is moved toward the disc periphery, i.e., away from the disc center, because the disc-head linear velocity increases as head radius increases. But the waveform amplitude can vary as a function of circumferential position, for a constant radius. Hence, setting an arbitrary maximum threshold is likely to result in errors because certain waveforms may not have sufficient amplitude to exceed the preset arbitrary amplitude, unless the amplitude is set as the very low level of 20–25% of maximum. On the other hand, relatively low noise in the track having high peak amplitudes is likely to have sufficient amplitude to exceed the arbitrary threshold level.

To obviate the requirement to set the threshold level at a predetermined, arbitrary, relatively low level of 20–25% of the maximum amplitude read by the magnetic head, a system has been developed to provide variable amplitude thresholds. The variable amplitude threshold is set by detecting the peak amplitude of the further undulations of the initial cells in each reference zone. In response to the detected peak amplitude of the further undulations, a threshold for the data representing undulations is set. This threshold is maintained while the second waveforms of the address cells of the reference zone are ready by the head. The variable threshold is compared with the amplitude of the second waveforms to enable the binary values of the address data cells to be determined.

While this system and method function admirably under many circumstances, it has been found that there are certain perturbations in the waveform at the amplifier output which exceed the threshold. The perturbations are due to electronic noise in the circuitry for reading data from the magnetic record, as well as magnetic flux variations on the record itself.

It is, accordingly, an object of the present invention to provide a new and improved system for and method of determining the existence of errors in signals read from reference zones of a magnetic record.

Another object of the invention is to provide a new and improved system for and method of detecting errors in servo position cell data read by a magnetic recording head from a magnetic record.

A further object of the invention is to provide a system for and method of detecting errors in the output of a magnetic recording head responsive to data cells in a reference zone of a magnetic carrier.

BRIEF DESCRIPTION OF THE INVENTION

In accordance with the present invention there is provided a new and improved apparatus for and method of determining errors in waveforms derived from cells of a reference zone, as read by a transducer for a magnetic recording medium. The transducer normally produces a waveform that exceeds a threshold value only once during each cell. The method involves determining whether the waveform derived by the transducer exceeds the threshold during cells of the reference zone other than at the correct time.

In accordance with a more specific aspect of the invention, the error is derived for cells representing address bits of zones on the medium. Each address bit is represented by magnetic variations in a cell, such that the waveform derived by the transducer in response to each address bit normally includes a relatively constant amplitude adjusting change segment and a data segment having a peak magnitude in excess of the threshold. The data segment is in one half or the other half of each cell, depending upon the number of the cell within the reference zone. In particular, if the cell number is even or odd, the peak amplitude is in a negative or positive direction relative to the average value. To determine if an error in the cell occurs, a determination is made as to whether the cell has an even or odd number and a determination is made as to whether the peak value has the correct polarity for the particular cell. For example, under normal circumstances even numbered cells include a single undulation with a negative peak amplitude exceeding the threshold value in either the first or second half of a cell. If a positive amplitude for an even numbered cell is detected, an indication is provided that the cell is in error. Similarly, odd numbered cells normally include undulations that exceed the threshold value only in the positive direction. If a negative threshold is detected during any odd numbered cell, an indication is provided that the cell is in error.

In accordance with a further aspect of the invention, the error is derived for servo positioning information for the magnetic head. Normally, the waveform derived by the head in response to each servo positioning cell includes a pair of relatively low amplitude sinusoidal-like segments undulating in the same first direction relative to an average value. These two sinusoidal-like variations are normally followed by a relatively large amplitude segment that undulates in the opposite, second direction, relative to the average value. Each cell is divided into three equal duration parts. The first and second undulations occur in the first and second parts of the cell, while the relatively large amplitude segment occurs in the last part or third of the cell. In response to a threshold in the direction of the large amplitude undulation occurring in either of the first or second segments, an indication is derived that the servo information position cell is in error and if the number of large pulse is incorrect during the servo information.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIGS. 5 and 5a include waveforms derived at various time intervals in the circuits of FIG. 2;

FIG. 7 includes waveforms derived during the first, second and third modes by a control circuit included in the apparatus of FIG. 2;

DETAILED DESCRIPTION OF THE DRAWINGS

Figure 1:
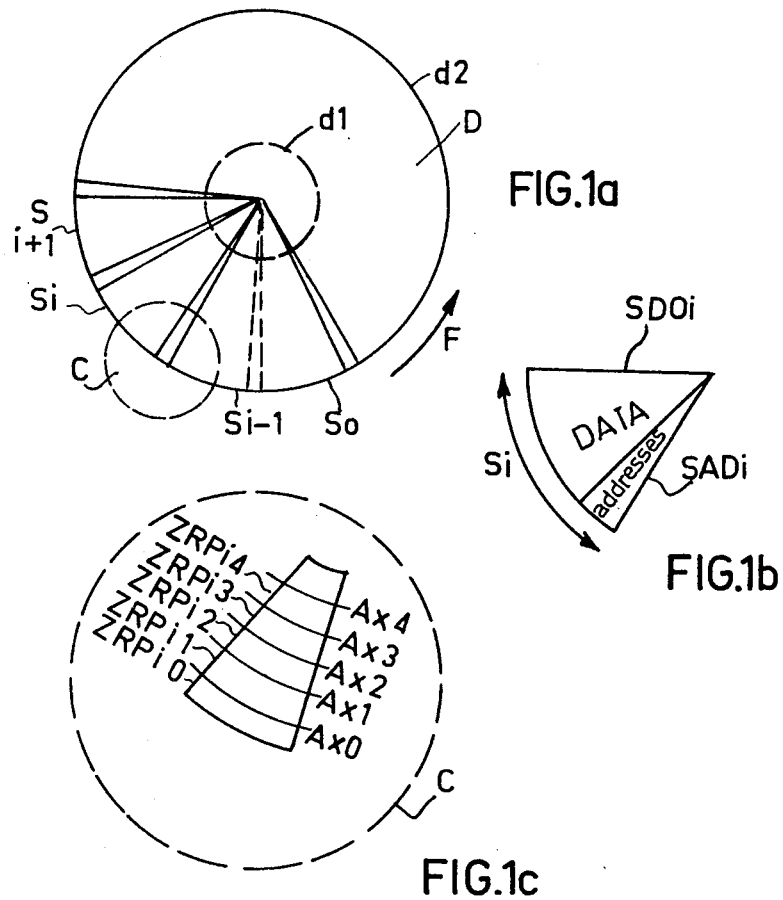
FIGS. 1a–1d are illustrations of a known format for distributing data over the surface of a magnetic disc.

Reference is now made to FIG. 1a of the drawings wherein there is illustrated a magnetic disc D rotating in the direction of arrow F at constant angular velocity. Disc D has a useful recording area bounded by concentric circles d1 and d2 on one face of the disc; it is to be understood that both faces of disc D contain similar useful areas, but that only one face of the disc is discussed in connection with FIG. 1. On disc D, n equal length sectors S0, ... Si, ... Sn of a circle are demarcated; only circles S0, Si−1, Si and Si+1 are illustrated. As illustrated in FIG. 1b, each sector is divided into a relatively large part SD0i and a much smaller part SADi. In part SD0i are recorded the data to be processed by a data processing system including the disc memory. In part SADi are recorded track addresses, as well as magnetic flux variations required to servo control the position of magnetic head T relative to axis Axj between adjacent concentric tracks ZRPij and ZRPi(j+1). The servo position magnetic flux variations or data, when read by head T, enable the head to be positioned over the center of a particular track.

In FIGS. 1c and 1d are enlarged views of part SADi of section Si; the views are contained within circle C to show in greater detail how parts SADi of sectors Si are formed. Each part SADi of section Si is divided into N reference zones ZRPio ... ZRPij ... ZRPi(n−1), where N is an integer representing the number of magnetic tracks on disc D. In FIGS. 1c and 1d, only the first five zones ZRP0 and ZRPi4 are shown for the sake of simplicity. The boudaries or axes between the various zones ZRPij are the circumferences Axj of the magnetic tracks. Each magnetic track of serial no. j and circumferential axis Axj has a zone ZRPij associated with it. Thus, track 0 is associated with zone ZRPi0, track 1 is associated with zone ZRPi1, etc. To simplify FIG. 1d, zones ZRPij and ZRPi(j+1) are illustrated as being rectangular. Each zone ZRPij contains the address of the track with which it is associated and is termed a reference positioning zone. The track addresses in each zone are preceded by the servo positioning data in the zone. As seen in FIG. 1d, zone ZRPi0 contains the address of track 0, zone ZRPi1 contains the address of track 1, zone ZRPi2 contains the address of track 2, etc.

Reading head $T_1$ is associated with the illustrated, obverse face of magnetic disc D, while a second reading head $T_2$ (not shown) is associated with the other, reverse face of the disc. Generally, data read by heads $T_1$ and $T_2$ are not simultaneously accepted by reading circuits of a magnetic disc memory system including magnetic disc D. Thus, the reading circuits initially accept the data read by one of the heads, e.g., head $T_1$, and then the data read by the other head, e.g., head $T_2$. Known circuitry is included in the disc memory system to perform a head selection change. The head selection change circuitry includes means for controlling the circuitry to change from accepting data read by head $T_1$ to accepting data read by head $T_2$. Each of reading heads $T_1$ and $T_2$ is able to occupy two positions, one termed a rest position where the head is unable to detect any data and thus cannot derive an analog output signal. In the other or second reading position, the head is located a few microns above the disc, at a position where it is able to detect magnetic flux variations representing data on the disc, and thereby derive signals that can be processed by the reading circuits.

Figure 2:
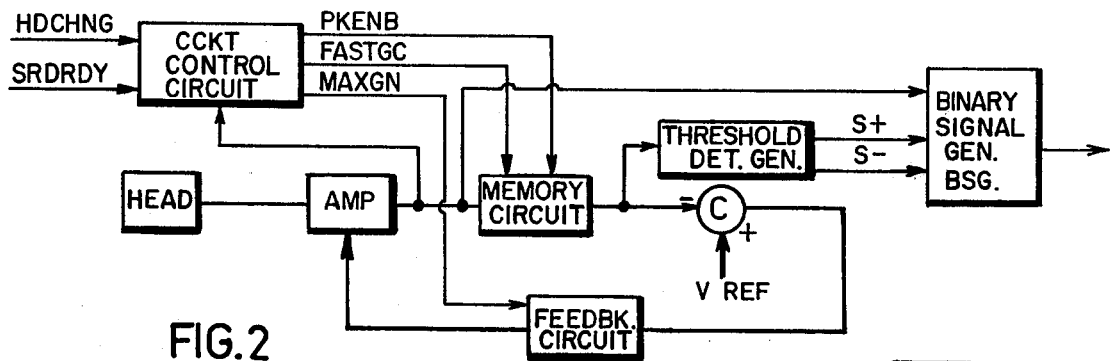
FIG. 2 is a block diagram of an apparatus responsive to data read from the disc.

In FIG. 2, a block diagram of an apparatus included in the invention, is illustrated a magnetic read/write head $T_1$ for reading the obverse face of the disc D of FIG. 1 and for supplying a signal to an input terminal of amplifier A, having an output connected to peak detector and memory circuit M. Amplifier A also has an output that is supplied to an input of control circuit CCKT. Control circuit CCKT is also responsive to binary head change signal HDCHNG and binary signal SRVRDY. A binary one level for head change signal HDCHNG indicates that a command to change from head $T_1$ to head $T_2$ or from head $T_2$ to head $T_1$ has been ordered, while a binary one level for signal SRVRDY indicates that a drive motor for disc D is operating at normal speed and that one of heads $T_1$ or $T_2$ is in position. Signals HDCHNG and SRVRDY are derived by circuits well known to those skilled in the art and, therefore, need not be described.

Control circuit CCKT derives output signals PKENB, FASTGC, MAXGN, and the complements thereof, PKENB*, FASTGC*, and MAXGN*. Generally, signal PKENB* has a binary one level while data are being read from the sectors between adjacent reference zones ZRPij once an SRVRDY signal has a binary one value. The signal PKENB* has a binary zero value only while servo position information is read from the reference zones, once the head is in position and the motor speed is normal. Signal FASTGC has a binary one value while signal SRVRDY has a binary one value and after the head encounters the beginning of a reference zone following the leading edge of signal SRVRDY. Signal FASTGC, however, has a binary zero value prior to the derivation of signal SRVRDY and until the head encounters the beginning of the first referencee zone which occurs after the leading edge of signal SRVRDY has been detected. Signal MAXGN has a binary zero value at all times, except during the interval immediately following the leading edge of signal HDCHNG and the head encountering the beginning of a reference zone next following after the leading edge of signal HDCHNG.

Memory circuit M responds to the analog output signal of amplifier A and the PKENB and FASTGC output signals of control circuit CCKT to derive a relatively constant d.c. output level indicative of the peak value derived by head T during the interval while the head is reading the magnetic flux variations in the servo position part of each reference zone. Memory circuit M maintains the peak voltage throughout the remainder of the reference zone, while the address bits are read by head T, and while data are read from the remainder of the sector, between adjacent reference zones.

The d.c. output voltage of memory circuit M is normally applied as a gain stabilizing input to amplifier A by a feedback control circuit. The feedback control circuit includes subtracting comparator C having an inverting input (−) responsive to the output of memory circuit M and a non-inverting input (+) responsive to a positive d.c. reference voltage, VREF. The difference between the output of memory circuit M and VREF is derived as a d.c. error output of comparator C which is applied to a feedback circuit R. Feedback circuit R includes a low pass filter responsive to the output of comparator C. Normally, the output of the filter included in feedback circuit R is applied to a gain control input of amplifier A. However, at the beginning of a head switching transition period, while signal MAXGN has a binary one value, the error signal derived from comparator C is decoupled from the gain control input of amplifier A, and a maximum gain control signal is applied to the gain control input of the amplifier.

To enable the value of address bits in the reference zone to be detected, as well as to enable errors in the output signal of amplifier A to be detected while head T is reading data from either the servo position information portion of the reference zone or the address bits of the reference zone, the output of memory circuit M is applied to threshold detection generator G. Threshold detection generator G responds to the output signal of memory circuit M to derive two d.c. voltage threshold levels S+ and S−. Levels S+ and S− are equal in amplitude, but are of opposite polarity. The amplitudes of levels S+ and S− are equal to 75% of the output of memory circuit M. Thresholds S+ and S− are combined with the output of amplifier A in binary signal generator BSG, which derives an output signal for the address bits in the reference zone, as well as indications of whether errors exist in the servo position information and/or the address bit signals derived while the head is in the reference zone. Details of the circuitry included in control circuit CCKT, threshold detection generator G, and binary signal generator G are described infra in connection with FIG. 8. Details of the circuitry included in amplifier A, memory circuit M, subtracting comparator circuit C and feedback circuit R are described infra in connection with FIGS. 3, 4 and 6. The various output signals of binary signal generator BSG are applied to circuits for reading the addresses, as well as for activating indicators for errors.

Figure 3:
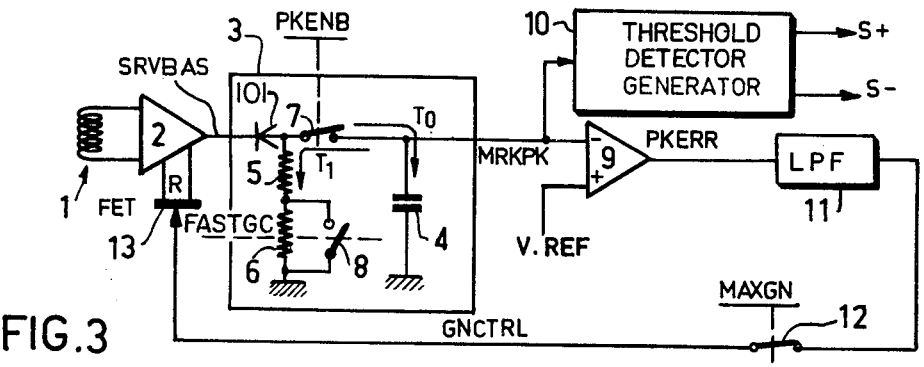
FIG. 3 is a circuit diagram of the apparatus of FIG. 2, when operated in a first mode.

Reference is now made to FIG. 3 of the drawings wherein there is illustrated a circuit diagram of some of the components included in the block diagram of FIG. 2. In FIG. 3 are also illustrated the positions of three switches responsive to the signals PKENB, FASTGC, and MAXGN while the apparatus is functioning in accordance with a first mode which exists prior to any usable logic signals being derived from head T.

Head T includes a magnetic read/write winding 1, which derives an analog signal that is applied to input terminals of amplifier circuit 2. Amplifier circuit 2 derives an analog output signal SRVBAS that is a replica of the signal transduced by winding 1. Signal SRVBAS is applied to negative peak detecting and memory circuit 3 which includes diode 101, having a cathode connected to the output of amplifier 2. The anode of diode 101 is connected to a shunt branch circuit including series resistors 5 and 6, selectively connected in parallel with shunt storage capacitor 4 by switch 7 which is closed in response to signal PKENB having a binary one value. While switch 7 is closed, diode 101, capacitor 4, resistors 5 and 6 function as a negative peak amplitude detector for the output signal of amplifier 2. The peak amplitude detector has a relatively long time constant in the operating mode illustrated in FIG. 3 because resistors 5 and 6 form the shunt branch circuit. The time constant of peak amplitude detector and memory circuit 3 is reduced by short circuiting resistor 6, a result attained by closing switch 8 in response to signal FASTGC having a binary one value. In the mode illustrated in FIG. 3, signal FASTGC has a binary zero value whereby switch 8 is open circuited and resistor 6 is effectively connected in series with resistor 5. With switch 8 open circuited, memory circuit 3 has discharge and charge time constant of approximately two milliseconds ($T_1$) and 0.2 microseconds ($T_o$), respectively.

The peak amplitude output signal MRKPK stored by capacitor 4 is also applied to threshold detection generator 10, which includes a resistive voltage divider (not shown) to reduce the amplitude of signal MRKPK by a predetermined amount, such as to a level of 75% of the amplitude of the voltage developed across capacitor 4. The voltage divider includes a tap on which is derived a negative reference level S−, as well as an inverting amplifier that converts the negative voltage at the tap into a positive reference voltage S+. As described infra in connection with FIG. 8, the values of S+ and S− are compared with the output of amplifier 2 in binary signal generator BSG.

The peak amplitude voltage MRKPK developed across and stored on capacitor 4 is also compared with a d.c. reference voltage by subtracting comparator amplifier 9. To this end, amplifier 9 includes an inverting input terminal responsive to signal MRKPK and a non-inverting input terminal responsive to the reference voltage VREF. Amplifier 9 derives an error signal PKERR which is applied to low pass filter 11, having an output that is selectively applied through switch 12 to control the gain of amplifier 2. Switch 12 is open in response to signal MAXGN having a binary one value, but is activated to the closed state in the first mode, as illustrated in FIG. 3, during which signal MAXGN has a binary zero value. The gain of amplifier 2 is controlled by a variable resistance between the source and drain electrodes of field effect transistor 13, having a gate electrode responsive to the d.c. voltage coupled through closed switch 12 in the first mode. In the first mode, the voltage applied to the gate electrode of field effect transistor 13 slaves the gain of amplifier 2 so signal SRVBAS at the output of amplifier A has the correct mean, d.c. level while no usable logic information is derived from the amplifier. Thereby, when voltage is derived from coil 1 while head T is at the reading position above disc D, the gain of amplifier 2 is appropriately set.

It is necessary for the address bits derived by binary signal generator BSG to be ready for processing as soon as the motor speed has reached a normal value and head $T_1$ or $T_2$ is in a reading position; such an occurrence is indicated by signal SRVRDY having a binary one value. As indicated supra, signal SRVRDY is derived by apparatus well known to those skilled in the art, and which includes a speed detector for the motor driving disc D and a signal generator which controls the position of heads $T_1$ and $T_2$ above the opposite faces of disc D. If the voltage, GNCTRL, coupled through switch 12 has a zero value, the resistance (R) between the source and drain electrodes of field effect transistor 13 is a minimum (R is less than 80 ohms) whereby the gain of amplifier 2 is maximized, at approximately 400. If voltage GNCTRL has a maximum amplitude, for example $-6$ volts, the source-drain resistance of field effect transistor 13 is maximized (R greater than 1 megohm) whereby the gain of amplifier 2 is a minimum, approximately 10.

Figure 4:
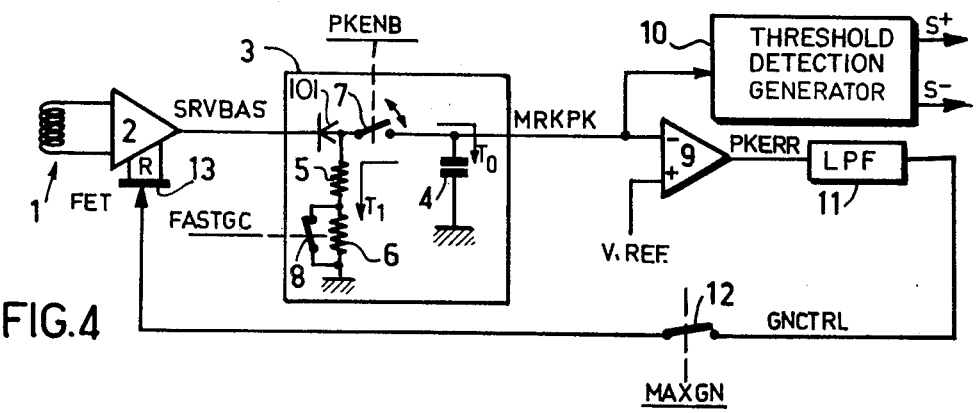
FIG. 4 is a circuit diagram of FIG. 2, when operated in a second mode.

In response to SRVRDY having a binary one value and during the intervals while the servo position flux variations are not read by head T, control circuit CCKT respectively generates binary output signals PKENB* and FASTGC as binary one values while signal MAXGN has a binary zero value, causing the circuit of FIG. 2 to assume a second mode of operation, as illustrated in FIG. 4. The second mode of operation occurs while sector SDOi and the address bits of sector SADi are being read by winding 1 of head T, but not while the servo position flux variations are being read. In response to the binary one values of signals PKENB* and FASTGC and the binary zero value of MAXGN, switch 7 is open circuited, switch 8 is closed, and switch 12 is closed, respectively.

To derive signals PKENB, FASTGC and MAXGN, control circuit CCKT derives several different internal binary signals SRVWND, ZRPWND, RDYEND, and SRVEN, having waveforms as illustrated in FIG. 7. In the first mode, while signal SRVRDY has a binary zero level, all of signals SRVWND, ZRPWND, FASTGC, PKENB*, HDCHNG, MAXGN and SRVEND generated by circuit CCKT have a binary zero value, while signal RDYENB has a binary one value. In response to signal SRVRDY changing from a binary zero to a binary one state to indicate that the motor speed is normal and that the heads are in a reading position, circuit CCKT is conditioned to be responsive to the first data signal of zone ZRPi, a relatively large amplitude negative pulse, termed a first marker pulse. In response to the first marker pulse of zone ZRPk, circuit CCKT derives a binary one ZRPWND signal, which is derived while the head is traversing the servo position flux variations and address bits in zone ZRPi. Simultaneously with the leading edge of signal ZRPWND, circuit CCKT derives a binary one pulse SRVWND which returns to a binary zero level after the head has traversed all of the servo position flux variations, but before any address bits in zone ZRPi have been traversed. Typically, the ratio of the durations of the binary one levels of signals ZRPWND nad SRVWND is 11:6. When all of the data bits in the following reference zone ZRPi have been read, the trailing edge of another ZRPWND signal occurs to terminate the second mode of operation.

In response to the leading edge of the first signal ZRPWND occuring after the binary zero to one transition of signal SRVRDY, circuit CCKT derives a binary one level for signal FASTGC. The binary one level for signal FASTGC remains as long as the memory system is operating in the second mode or in a third mode which occurs while there is a transition from reading data with head $T_1$ to reading data with head $T_2$ or from $T_2$ to $T_1$; typically such a transition requires the head to traverse 14 sectors and the third mode lasts for 15 sectors, to enable the system to be stabilized when the second mode resumes. In response to the trailing edge of the first SRVWND signal derived during the second mode, circuit CCKT derives a binary one value for signal PKENB*. Signal PKENB* retains a binary one level until the leading edge of the next occurrence of a binary one level for signal SRVWND, at which time signal PKENB* returns to a binary zero value. Thereafter, signals SRVWND and PKENB* have complementary values.

When it is desired to change from reading data from head $T_1$ to head $T_2$, or vice versa, signal HDCHNG has a binary one value for a relative short interval, at the beginning of mode 3, as indicated in FIG. 7. In response to the leading edge of signal HDCHNG, circuit CCKT derives signal MAXGN as a binary one value. The binary one value of signal MAXGN continues until the next reference zone is read by the head, as indicated by the leading, negative going edge of signal PKENB* which occurs after the leading, positive edge of signal HDCHNG. In response to the leading edge of signal HDCHNG, signal SRVENB is driven to a binary one state and remains in the binary one state until a predetermined number (e.g. 14) of sectors have been traversed during an interval required for a transition from head $T_1$ to $T_2$ or vice versa. Circuit CCKT also responds to the leading edge of the binary one value for signal HDCHNG to cause signal RDYENB to make a binary one to zero transition. Signal RDYENB remains in a binary zero state for one sector more than signal SRVENB remains in a binary one state, so that when the third mode has been completed, at the trailing edge of signal RDYENB, the circuit is ready to read data from the next reference zone on the reverse face of the disc.

Figure 5:
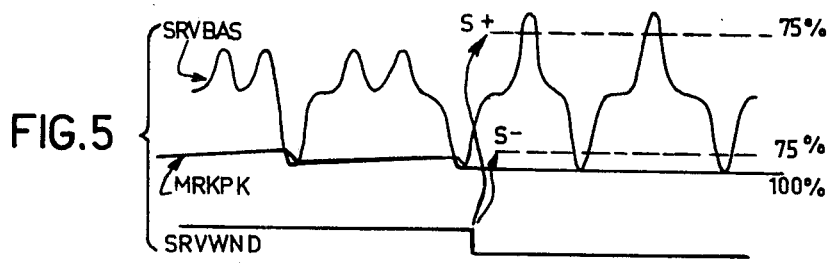

As illustrated in FIGS. 5 and 5a, output signal SRVBAS of amplifier 2 includes multiple, sequential waveforms of like shape while servo position information is being read by winding 1 during the interval while signal SRVWND has a binary one value. Each of the waveforms is divided into three relatively equal duration parts. The first and second parts respectively include first and second pseudo sinusoidal segments having positive values relative to a mean value of the waveform. The pseudo sinusoidal segments control the position of the head in the center of the track; the amplitude of the two segments is equal when the head is correctly positioned. The third part includes a negative pulse having a relatively large excursion from the mean value, i.e., considerably larger than the amplitude of the sinusoidal segments. The first servo position information waveform is preceeded by a negative pulse, similar to that in the last third of each waveform. The negative pulse is converted into the first marker pulse of the reference zone.

While signal SRWND has a binary one value, signal PKENB* has a binary zero value, to close switch 7, whereby the voltage across capacitor 4 has the waveform illustrated to the left of the transition in FIG. 5 of signal SRVWND while the servo information position is read by head T. During the stated interval, signal MRKPK, across capacitor 4, has a negative d.c. level relative to the average value of waveform SRVBAS. The peak negative amplitude of signal MRKPK is proportional to the peak value of the pulse during the last third of each servo position waveform. Between the negative peak values of adjacent servo position waveforms the negative voltage on capacitor 4 discharges slowly back toward the average value of signal SRVBAS, at a rate determined by the discharge time constant of memory circuit 3. Each time that the peak negative value of the waveform is reached, there is a sudden negative increase in the voltage across capacitor 4 at a rate determined by the charging time constant of memory circuit 3.

While address bits are read from a reference zone and data bits are read from the following sector the system is in the second mode, illustrated in FIG. 4. In the second mode signal PKENB* has a binary one level, to open circuit switch 7 and enable the voltage across capacitor 4 to remain constant, as indicated to the right of the negative going transition for signal SRVWND as illustrated in FIG. 5. The resulting constant value of signal MRKPK is supplied to threshold detection generator 10 where it is converted into threshold values S+ and S−. As indicated in FIG. 5, the SRVBAS output of amplifier 2, during this interval includes a multiplicity of repetitive waveforms, having an average value substantially equal to the average value of the waveforms to the left of the transition in signal SRVWND and peak values generally of the same magnitude as the peak value of the pulse during the last third of the servo position waveform. The peak amplitudes of signal SRVBAS while the head is reading address bits from the reference zone can be positive or negative. The detection process and apparatus involves determining whether the peak amplitude of each address bit is positive or negative and whether the peak amplitude occurs in the first or second half of the address bit.

Because the peak amplitude is a function of head position, both radially and circumferentially, it is important to change the threshold level as each reference zone is read. Thereby, the voltage across capacitor 4 at the time of the transition in SRVWND forms a basis for establishing a reference threshold to detect whether the track address signals derived from amplifier A exceed positive or negative percentages of the voltage across capacitor A when the SRVWND transition occurs. The value of signal MRKPK when switch 7 opens is converted into thresholds S+ and S−, positive and negative voltages equal, in a preferred embodiment, to 75% of the value of the level stored on capacitor 4. The threshold level is set to 75% of the peak amplitude detected by circuit 3 because the peak level of the signals which are read from a sector may vary by 20%. The address bit outputs of amplifier 2, as illustrated to the right of the transition in FIG. 5, are amplitude compared in binary signal generator BSG with threshold values S+ and s− to derive binary values for the address bits of one of zones ZRPij.

In the second mode, at all times subsequent to the leading, positive going edge of the first SRVWND pulse, signal FASTGC has a binary one value. The binary one value causes switch 8 to close, to short circuit resistor 6. Thereby, while the servo position information is read by head T, during the interval between the leading edges of pulses FASTGC and PKENB*, circuit 3 has a charging time constant of 0.2 microseconds and a discharge time constant of 0.01 millisecond. The voltage on capacitor 4 just prior to opening of switch 7 remains on the capacitor until the next servo position information is read by head T, i.e. the capacitor voltage remains constant while signal SRVWND has a binary zero value. The constant and slowly changing values of signal MRKPK, illustrated in FIG. 5, are compared with a reference voltage supplied to subtracting amplifier 9. The resulting error signal derived by amplifier 9, PKERR, is supplied to low pass filter 11, having a cutoff frequency of six Hertz. The six Hertz cutoff frequency of filter 11 is such that gain changes of amplifier 2 cannot track variations in the amplitude of the signal derived by head T during the time required for disc D to make one revolution, but it does ensure a correct average level output of the filter. In response to the first marker pulse in the next reference zone being detected, signal SRVWND is set to a logic one value, to close switch 7 and enable the peak value of MRKPK to be again detected.

Figure 6:
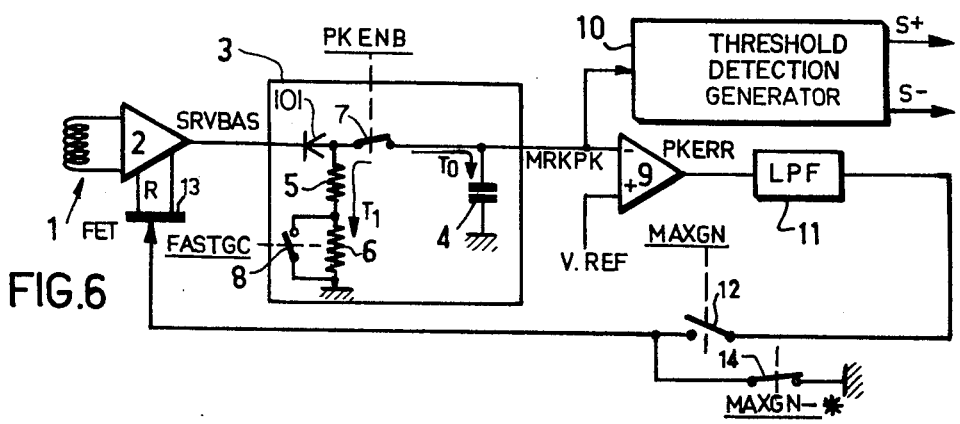
FIG. 6 is a circuit diagram of the apparatus illustrated in FIG. 2, in a third mode of operation.

A third mode of operation is illustrated in FIG. 6. The system is switched to the third mode at the time a head selection change is being performed, i.e., when a transition is made in reading signals from head $T_1$ to head $T_2$, or vice versa. Such a transition may take 14 sectors and it is necessary after 15 sectors to read data from the newly selected head. While the transition occurs certain circuits are disabled, as described infra. However, in order to accurately read data from the head after 15 sectors have been traversed, the gain of amplifier 2 must be controlled during the transitional interval and must be set at the proper level when signals are read from the newly selected head. Obviously, the signal amplitude read from the newly selected head has no bearing to the signal amplitude read from the previously selected head. The general procedure is to maximize the gain of amplifier 2 for the first sector immediately after the transition is ordered by the leading edge of pulse HDCHNG. For the remaining 14 sectors, after the transition, switches 7 and 8 are activated as during the second mode and the gain of amplifier 2 is slaved to signal SRVBAS.

The third mode is instigated in response to the leading edge of pulse HDCHNG. In response to the leading, positive going edge of pulse HDCHNG, circuit CCKT derives signal MAXGN as a binary one value to maximize the gain of amplifier 2. The binary one value of MAXGN continues until the beginning of the next reference zone is encountered by the newly selected head, at which time a leading, negative going edge of signal PKENB is derived.

In response to the binary one value of signal MAXGN, switch 12 is open circuited, so that the gate of field effect transistor 13 is unresponsive to the output signal of filter 11. Simultaneously, and in response to signal MAXGN* having a binary zero value switch 14 is closed, so that ground voltage is applied to the gate of field effect transistor 13. Grounding the gate of field effect transistor 13 maximizes the gain of amplifier 2. In the third, transitional mode, switches 7 and 8 respond to signals PKENB* and FASTGC in the same manner as described in connection with the second mode after the leading edge of signal FASTGC.

After a transition has been commanded fourteen disc sectors Si are required to return amplifier 2 to the correct mean gain level, from the maximum gain level, imposed by closure of contact 14. In response to signal SRVENB having a binary one level during the fourteen sectors, the following functions are disabled:

(1) acceptance of the read address, because the address may be erroneous;
(2) the acceptance of errors in reading zone ZRP; and
(3) servo control of the position of heads T.

The functions are disabled by preventing current from flowing in the winding of the motor which controls movement of heads $T_1$ and $T_2$, thereby preventing any substantial movement by the head carrying carriage during the transition interval in reading data from heads on opposite faces of the disc. In addition, a signal RDYEND which is supplied to management circuits (not shown) of the disc memory system has a binary zero value during the period required to read fifteen consecutive sectors Si.

Reference is now made to FIG. 8 of the drawings wherein there is illustrated a circuit diagram of control circuit CCKT and binary signal generator BSG which together derive signals SRVWND, ZRPWND, FASTGC, PKENB*, MAXGN, RDYENB, and SRVENB in response to signals HDCHNG and SRVRDY, as well as the output of head T. In the first mode, each of these signals, except signal RDYENB, has a binary zero level, a result achieved by appropriately setting all of the flip-flops and counters in control circuit CCKT when the system is initially activated. At the beginning of the second mode, a binary zero to binary one transition occurs in signal SRVRDY in response to external circuitry sensing that the motor speed is normal and the heads are in a reading position.

Figure 8A:
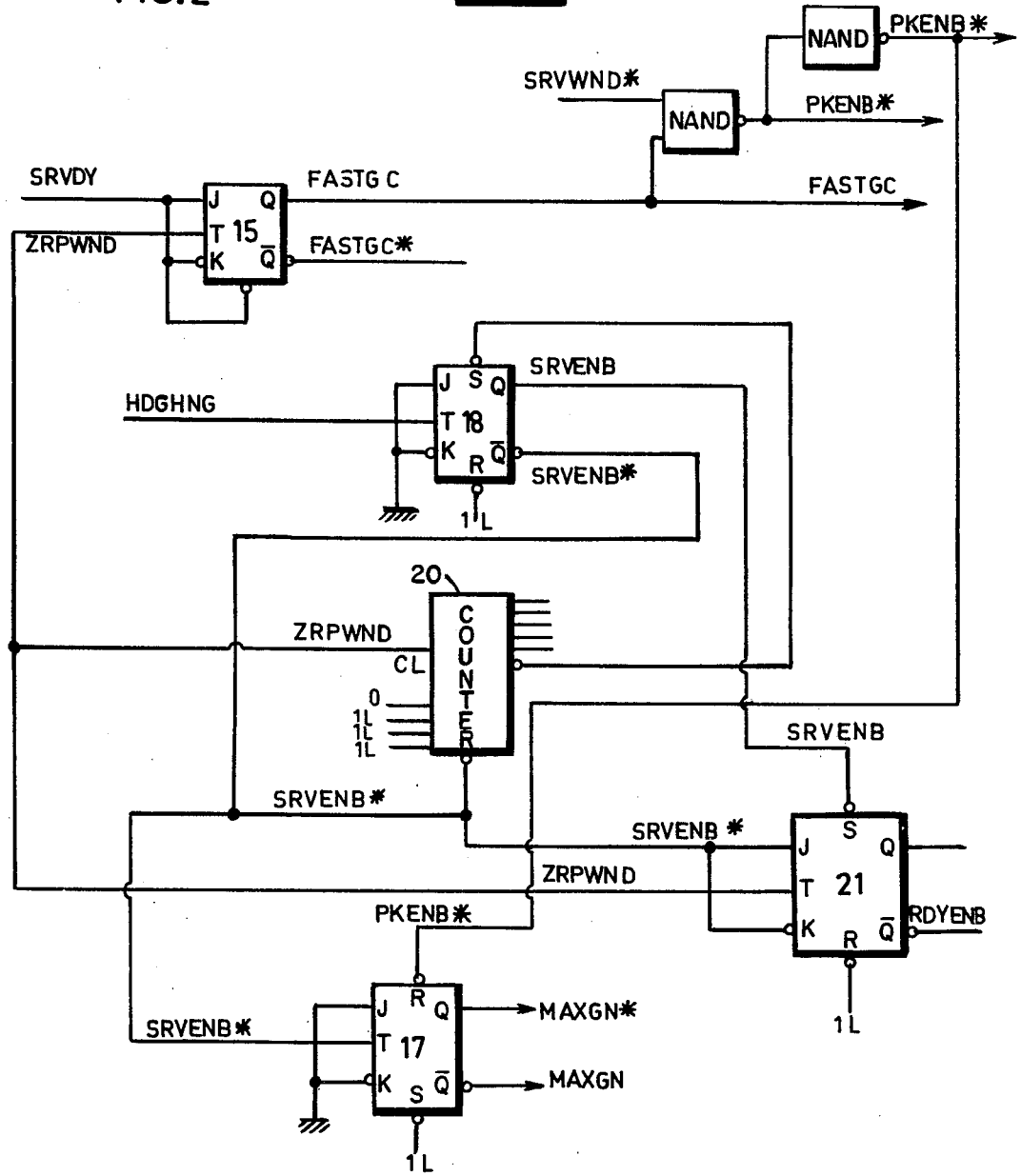
FIGS. 8a, 8b, 8c and 8d are circuit diagrams of elements included in the control circuit and binary signal generator of the apparatus of FIG. 2.

To control signal FASTGC, the positive going transition of signal SRVRDY is coupled to J, K and reset (R) inputs of bistable J-K flip-flop 15, FIG. 8a, to enable the flip-flop. (All K inputs of J-K flip-flops include an inverter circuit, as indicated by the circles on the circuit diagrams.) Once enabled, flip-flop 15 is triggered into a binary one state in response to the leading edge of signal ZRPWND, coupled to the trigger input of the flip-flop, so that a binary one is derived at the Q output of the flip-flop; signal FASTGC has a binary one value in response to a binary one at the Q output of flip-flop 15.

Signal ZRPWND is derived for the duration of each reference zone by circuit CCKT in response to the output of amplifier A. Signal ZRPWND is derived by binary signal generator BSG by combining the SRVBAS output of amplifier 2 with the thresholds S+ and S− derived from the threshold detection generator 10. Binary signal generator BSG includes comparison amplifiers 101 and 102, FIG. 8d, respectively having positive and negative inputs responsive to signal SRVBAS and negative and positive inputs respectively responsive to signals S+ and S−. Amplifier 101 derives complementary output signals MRKP2 and MRKP2* having binary one levels in response to signal SRVBAS being respectively greater than and less than threshold level S+. Similarly, amplifier 102 derives complementary output signals MRKN2 and MRKN2* having binary one levels in response to signal SRVBAS being respectively less than and greater than threshold level S−. Signal MRKN2 thus has a binary one value in response to the first negative, marker pulse read by head T in a data signal of reference zone ZRPij. The MRKN2 signal derived in response to the first negative pulse at the beginning of reference zone SRPij is gated through NAND gate 103 to form a first marker signal. NAND gate 103 is initially enabled in response to a binary one value of signal ZRPWND* at the Q output of flip-flop 105. Flip-flop 104 includes a set input that is reponsive to signal ENDSRV, which indicates that six servo position information cells in zone ZRPij have been detected. (The manner in which signal ENDSRV is derived is discussed infra.) Flip-flop 104 is activated so signal SRVWND at the $\bar{Q}$ output thereof has a binary one value while the six servo position waveforms at the beginning of a reference zone are being read by head T.

The first marker pulse of each reference zone, as derived from NAND gate 103, is applied to a trigger input of flip-flop 105. Initially, flip-flop 105 is activated so that signal ZRPWND derived at the $\bar{Q}$ output terminal thereof has a binary zero value, a result achieved by supplying a positive bias voltage to the R terminal of the flip-flop. The first marker pulse from NAND gate 103 activates flip-flop 105 so that signal ZRPWND, at the $\bar{Q}$ output of the flip-flop has a binary one level. Flip-flop 105 remains energized so that signal ZRPWND has a binary one level for the entire duration of the reference cell, until all six servo position cells and all eleven address cells have been read by head T. When the last address cell has been read, signal ENDCOD is derived, in a manner described infra. Signal ENDCOD is applied to the set (S) input of flip-flop 105 causing the flip-flop state to change, whereby signal ZRPWND reverts back to a binary zero level.

The initial binary zero to binary one transition of signal ZRPWND is applied to the trigger (T) input of flip-flop 15, (FIG. 8a) causing signal FASTGC, at the Q output of flip-flop 15, to change to a binary one level. The binary one level for signal FASTGC is applied to one input of NAND gate 16, having a second input responsive to signal SRVWND* at the Q output of flip-flop 104. In response to the binary one level for signal FASTGC and signal SRVWND having a binary zero level, NAND gate 16 derives signal PKENB as a binary one level, as indicated in FIG. 7. Hence, signal PKENB* is the complement of signal SRVWND, after signal FASTGC has achieved a binary one level.

At the beginning of the third mode, signal HDCHNG is derived by an external source as a binary one value, (FIG. 8a), having an output supplied to the trigger (T) input of J-K flip-flop 18. The reset (R) input of flip-flop 18 has a positive d.c. bias voltage applied to it, so that the flip-flop is initially activated and signal SRVENB at the Q output thereof has a binary one value. In response to the positive going leading edge of signal HDCHNG, flip-flop 18 is triggered and changes state, so that signal SRVENB at the Q output thereof has a binary zero level. Signal SRVENB remains at a binary zero level until the set (S) input of flip-flop 18 is supplied with a logical zero level as occurs after 14 sectors have been traversed by head T after a head change order, as indicated at 14 SRVWND signals being derived subsequent to the leading edge of signal HDCHNG. To this end, signal ZRPWND is applied to a clock input of counter 20 that is enabled in response to a binary one level for signal SRVENB* at the $\overline{Q}$ output of flip-flop 18. Thereby, ZRPWND signals which occur while flip-flop 18 is initially activated and signal SRVENB* has a binary zero level have no influence on the counter 20. Counter 20 includes four additional binary inputs which are responsive to the binary equivalent (1110) of the decimal number 14. In response to 14 sectors being read by magnetic head T, as indicated by 14 occurrences of signal ZRPWND, counter 20 responds to the four binary bits representing the number 14 and a stored count of fourteen to derive a binary zero output that is applied to the set input of flip-flop 18.

Flip-flop 17 (FIG. 8a) is provided to derive signal MAXGN, having a binary one level between the leading edge of signal HDCHNG and the leading, negative going edge of signal PKENB*, the first time it appears in the third mode. Flip-flop 17 includes a trigger input responsive to signal SRVENB*, derived at the $\overline{Q}$ output of flip-flop 18. Flip-flop 17 is initially activated so that signal MAXGN, derived at the $\overline{Q}$ output thereof, has a binary zero value, a result achieved by supplying a positive d.c. bias voltage to the reset (R) input of the flip-flop. Flip-flop 17 responds to the negative going transition at the $\overline{Q}$ output of flip-flop 18, which occurs when signal SRVENB* goes from a binary one to a binary zero level. Flip-flop 17 is thus activated so that signal MAXGN, at the $\overline{Q}$ output thereof has a binary one level. Flip-flop 17 remains in this state until a negative transition occurs in signal PKENB*, at the output of NAND gate 16. In response to the negative going transition at the output of NAND gate 16, as coupled to the set (S) input of flip-flop 17, the flip-flop returns to its initial state, whereby signal MAXGN returns to a binary zero level.

Signal RDYENB, which is supplied to management circuits for the disc memory system (not shown), is disabled during the period required to read fifteen consecutive sectors at the beginning of the third mode of operation. Signal RDYENB, derived at the $\overline{Q}$ output of flip-flop 21, initially has a binary one level, a result achieved by biasing the reset (R) input of the flip-flop with a positive d.c. voltage. The J and K input terminals of flip-flop 21 respond to signal SRVENB* at the $\overline{Q}$ output of flip-flop 18. Flip-flop 21 also includes a trigger (T) input responsive to signal ZRPWND. Flip-flop 21 responds to signals SRVENB* and ZRPWND so that the flip-flop changes state in synchronism with the negative going leading edge of signal SRVENB*. In response to the negative going transition of signal SRVENB, flip-flop 21 derives signal RDYENB as a binary zero level and remains in this state while fifteen sectors are traversed by the newly selected head T. Upon the completion of the fifteen sectors, the positive going transition of signal ZRPWND triggers flip-flop 21 back to the initial state. Flip-flop 21 is activated back to its initial state in response to the fifteenth occurrence of signal ZRPWND because signal SRVENB is supplied to the set (S) input of the flip-flop. During the first fourteen sectors, signal SRVENB, at the Q output of flip-flop 18, has a binary zero level which prevents the flip-flop from being responsive to the position going edge of signal ZRPWND.

Figure 8B:
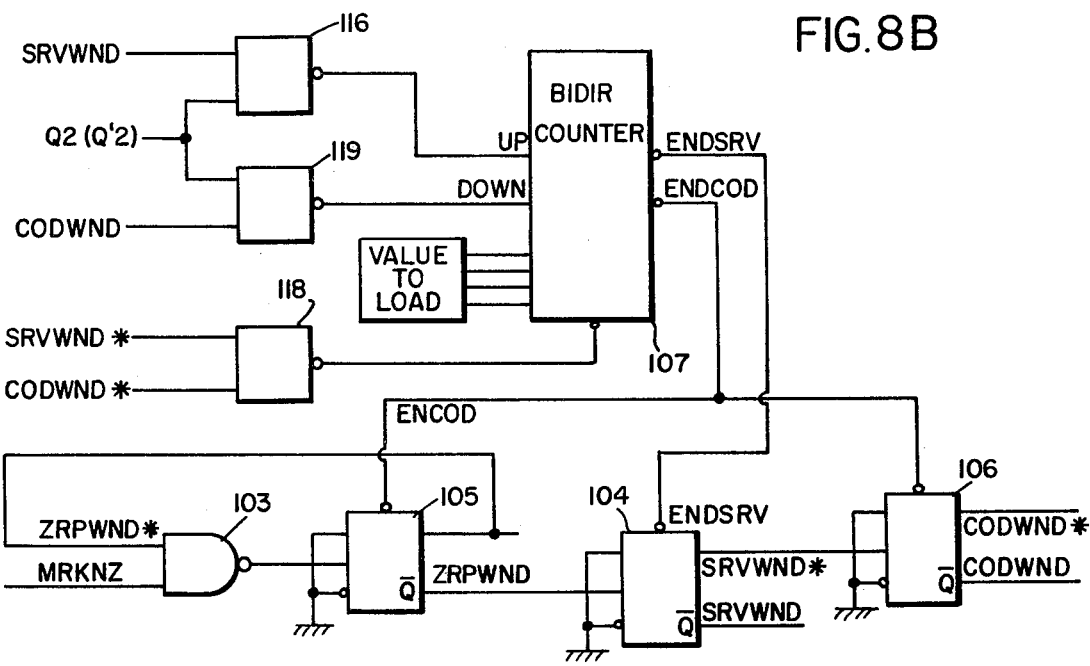

Consideration is now given to the circuitry for deriving signals ENDSRV and ENDCOD which are applied to the set inputs of flip-flops 104 and 105, FIG. 8b. To these ends, signal SRVWND at the $\overline{Q}$ output of flip-flop 104 is applied to the trigger (T) input of flip-flop 106, initially biased by a positive d.c. voltage at its reset (R) input so that signal CODWND derived from the $\overline{Q}$ output of the flip-flop has a binary zero level. Flip-flop 106 is triggered by the trailing negative going edge of signal SRVWND after the six servo positioning cells have been read by head T. Thereby, flip-flop 106 changes state as head T starts to read the eleven address bits, during which signal CODWND has a binary one level. The binary one level of signal CODWND is maintained for eleven address cells, until signal END-COD is coupled to the set (S) input of the flip-flop from counter 107.

Signals CODWND and SRVWND, and the complements thereof, as derived at the outputs of flip-flops 104 and 106, are combined with periodically derived signals Q2 and Q'2 to control bidirectional counter 107 which derives signals ENDSRV and ENDCOD. Signal Q2 has a binary one value for the first third of each of the six servo position information cells read by head T in each reference zone. In contrast, signal Q'2 has a binary one level for approximately the first half of each address cell read by head T in each reference zone. The apparatus for deriving signals Q2 and Q'2, illustrated in FIG. 8c, includes cascaded bistable flip-flops 108 and 109, selectively interconnected as three phase and two phase triggered periodic sources by a feedback circuit including logic circuit 111. Circuit 111 includes NAND gates 112 and 113 respectively responsive to signals SRVWND and CODWND to determine whether a three or two phase periodic signal is to be derived. Flip-flop 108 includes a trigger (T) input responsive to pulses from clock source 20 and is synchronized by the first marker pulse derived from NAND gate 103 so that the output pulses thereof always occur a predetermined interval after the first marker pulse from the head in each reference zone. Initially, flip-flop 21 is biased by a positive d.c. voltage applied to the set (S) input thereof so that signals Q2 and Q'2 at the output of the Q terminal of the flip-flop have binary zero values. Flip-flop 108 includes J and K input terminals respectively responsive to a feedback signal from logic network 111 and the $\overline{Q}$ output of the flip-flop. Flip-flop 108 also includes a reset input responsive to signal ZRPWND at the $\overline{Q}$ output of flip-flop 105, so that the flip-flop 108 can change state only while signal ZRPWND has a binary one value, i.e. while a reference zone is being read by head T.

In response to the signals applied to flip-flop 108, the flip-flop is activated so that a binary one level is derived at the Q output thereof during the first third of each servo information position cell; it is to be recalled that six such cells occur at the beginning of each sector. The signal at the Q output of flip-flop 108 is coupled in parallel to the J and K input terminals of flip-flop 109, having a trigger (T) input also responsive to the output of clock 20. Flip-flop 109 incldues set (S) and reset (R) terminals respectively responsive to the positive d.c. bias voltage and signal ZRPWND, whereby flip-flop 109 can change state only while reference zones are read by head T. Flip-flop 109 responds to the signals applied thereto to derive a binary one level during the second thrid of each of the six servo position informa-tion cells at the beginning of each sector.

To control whether a two phase signal (Q'2) or three phase signal is derived, the signals at the $\overline{Q}$ outputs of flip-flops 108 and 109 are combined in logic network 111 with signals SRVWND and CODWND at the $\overline{Q}$ outputs of flip-flops 104 and 106, respectively. To this end, the $\overline{Q}$ output of flip-flop 109 and signal SRVWND are combined in NAND gate 24, while signal CODWND is combined with the $\overline{Q}$ output of flip-flop 108 in NAND gate 113. The output signals of NAND gates 112 and 113 are combined in NAND gate 114, having an output which is applied to the J input of flip-flop 108. The circuitry including flip-flops 108 and 109 and logic network 111 thereby derives a three phase bilevel output signal during each of the six servo information position cells at the beginning of each sector read by head T, while signal SRVWND applied to NAND gate 112 has a binary one value. The first, second and third phases are respectively derived from the Q output of flip-flop 108 (signal Q2), the Q output of flip-flop 109, and the output of NAND gate 23. The three phase signal is inhibited after the six servo information position cells have been read out in response to a binary zero value for signal SRVWND being applied to gate 112.

Figure 8C:
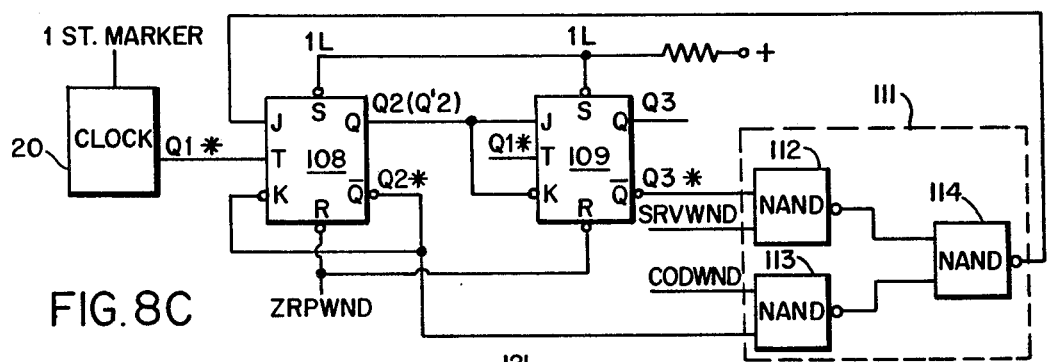

The first phase of the three phase signal derived from the source of FIG. 8c is combined with signal SRVWND in NAND gate 116, whereby the NAND gate derives a binary one pulse during the first third of each of the six servo information position cells occurring at the beginning of each reference zone. The six pulses are applied to an up count input of bidirectional counter 107. The counter is preloaded with 9. After six pulses have been counted by counter 107, the counter derives signal ENDSRV which is applied to the set (S) input of flip-flop 104 to reset signal SRVWND to a binary zero level and disable NAND gate 116 so that additional pulses from the Q output of flip-flop 108 are not applied to the up count input of counter 107. Counter 107 is reloaded to eleven by coupling signal SRVWND* at the Q output of flip-flop 104, to the parallel load enable input of the counter by way of NAND gate 118.

To derive signal ENDCOD when eleven address cells have been traversed by head T in each reference zone, signal CODWND, at the $\overline{Q}$ output of flip-flop 106, is combined in NAND gate 119 with the Q output of flip-flop 108. The resulting pulses derived from NAND gate 102 are applied to a down count command input of bidirectional counter 107. In response to eleven pulses being applied to the down count input of counter 107, the counter derives signal ENDCOD as a binary one level. The binary one value of signal ENDCOD is applied in parallel to the set (S) inputs of flip-flops 105 and 106, whereby signals ZRPWND and CODWND return to the binary zero level. Simultaneously, signal CODWND* has a binary one level, which is coupled through NOR gate 118 to the reset (R) input of bidirectional counter 107, to reset the counter to zero.

Figure 9:
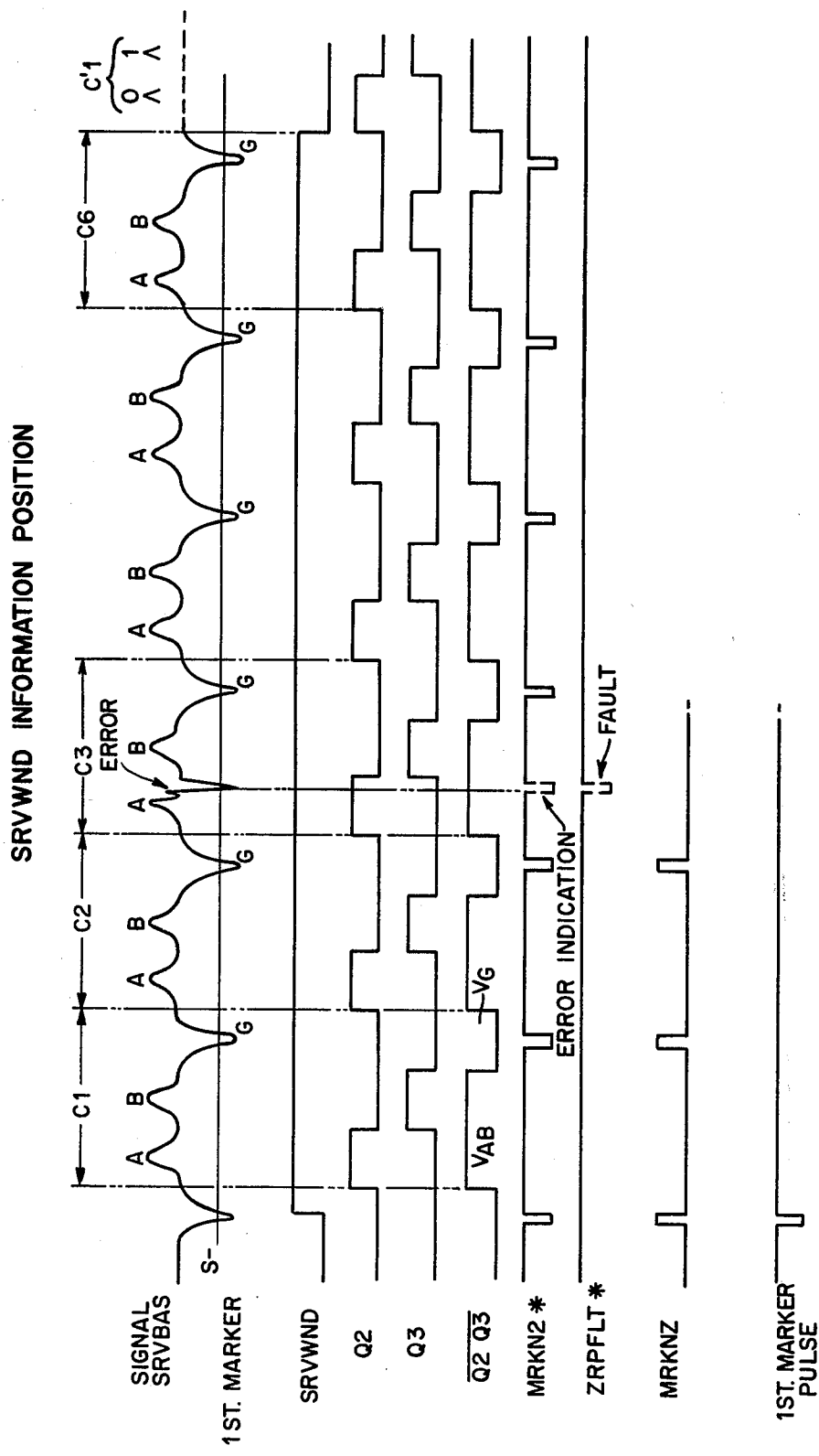
FIG. 9 includes waveforms derived by the circuits of FIGS. 2 and 8 while a magnetic head is reading servo position information data from a magnetic disc.

To derive an indication of the servo information position contained in the first six cells of each sector, each cell is divided into three equal length intervals. During the first and second intervals, binary one levels are respectively derived from the Q output terminals of flip-flops 108 and 109; during the third interval, a binary zero level is derived from the output of NAND gate 114. As indicated by the waveforms of FIG. 9, the output waveform SRVBAS of amplifier 2 during the first and second intervals of each cell normally includes a pair of sinusoidal undulations having peak values A and B and a base, at the average value of the waveform. After the second sinusoidal undulation, there is a negative pulse having a peak amplitude G. The negative pulse has a peak amplitude that controls threshold level S−; it begins and ends at the average value of the waveform.

Errors can occur in the waveform of signal SRVBAS because of various factors, such as noise on the track or in the amplifier. Such errors result in pulses having negative amplitudes greater than the negative threshold S−; as indicated in cell C3 on FIG. 9. Generally, each time that the waveform of signal SRVBAS has a negative amplitude in excess of negative threshold S−, a pulse MRKN2* is derived from amplifier 102. If the negative threshold is exceeded during the first or second portion during any of the servo information position cells, such an error is indicated by a binary zero pulse in signal ZRPFLT*, FIG. 9.

Figure 10:
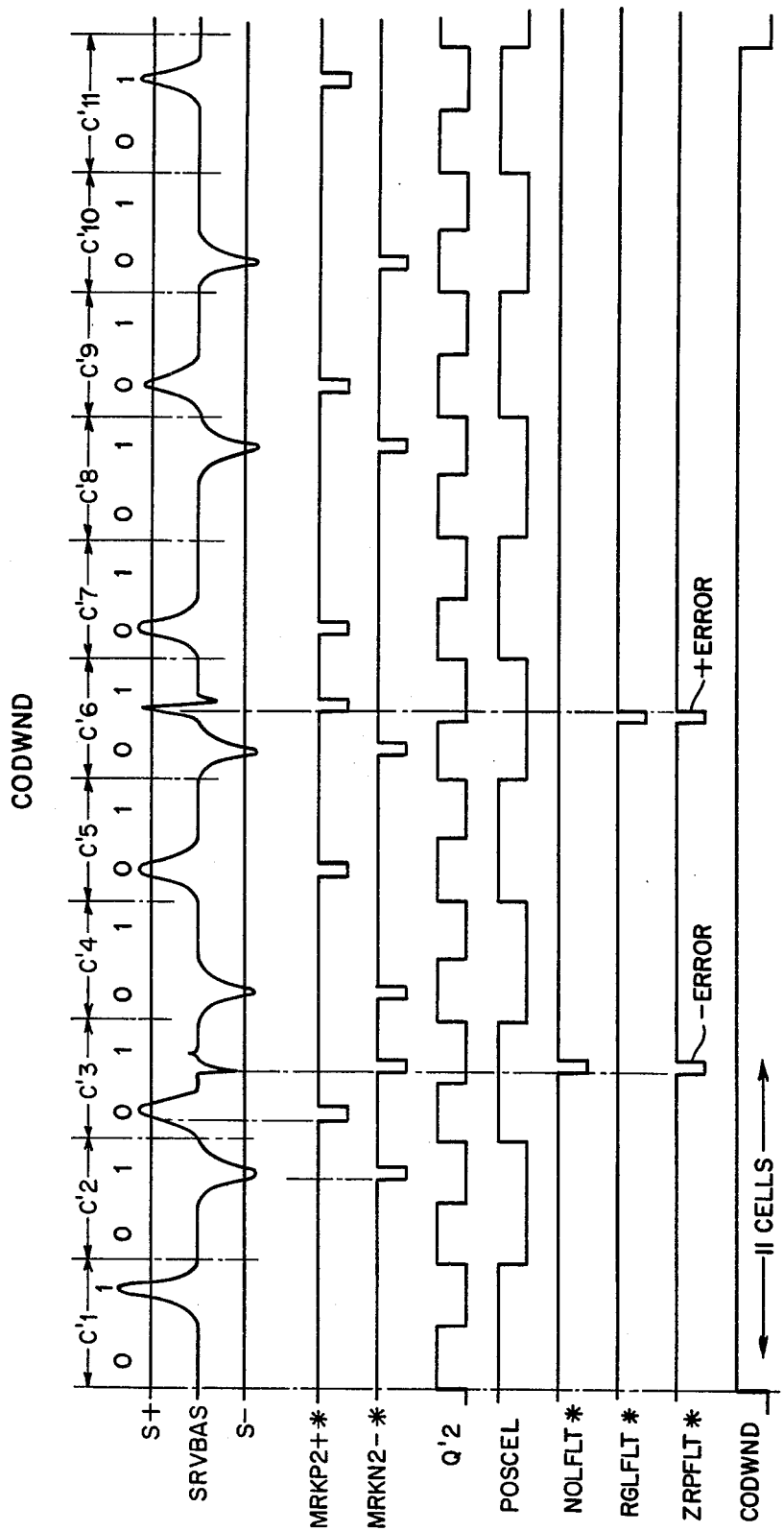
FIG. 10 includes waveforms derived by the circuits of FIGS. 2 and 8 while a magnetic head is reading binary coded addresses from the magnetic disc.

While head T is responsive to the binary bits of the eleven address cells, the output signal of amplifier 2 has a different waveform, indicated by signal SRVBAS, FIG. 10. Each of the address cells is divided into two equal length parts, with the first portion occurring while signal Q'2 at the Q output of flip-flop 108 has a binary one level. During the second segment of each cell, signal Q'2 at the Q output of flip-flop 108 has a binary zero level and a binary one level is applied by signal CODWND to one input of NAND gate 113.

The eleven cells from C'1 to C'11 contain the eleven bits of the address. One bit per cell. The odd cells like C1, C3, . . . C11 must have a positive alternance; the even cells like C2, C4, . . . C10 must have a negative alternance. If a positive or negative alternance is located on position zero when the signal Q'2 has a logical one level, the bit address contained is read as a zero. If a positive or negative alternance is located on position one when the signal Q'2 has a logical zero level, the bit address contained is read as a one. Those positive and negative have to exceed the positive and negative threshold (S+ and S−) to be significant. For instance, the information address given on FIG. 10 is 11000001001 (binary code). The waveforms read from cells C3 and C6, as illustrated, include errors because a negative pulse is found on cell #3 and a positive pulse on cell #6. When those parasite pulses exceed the thresholds S+ and S− they give a false information address.

The apparatus of the present invention indicates these faults.

Figure 8D:
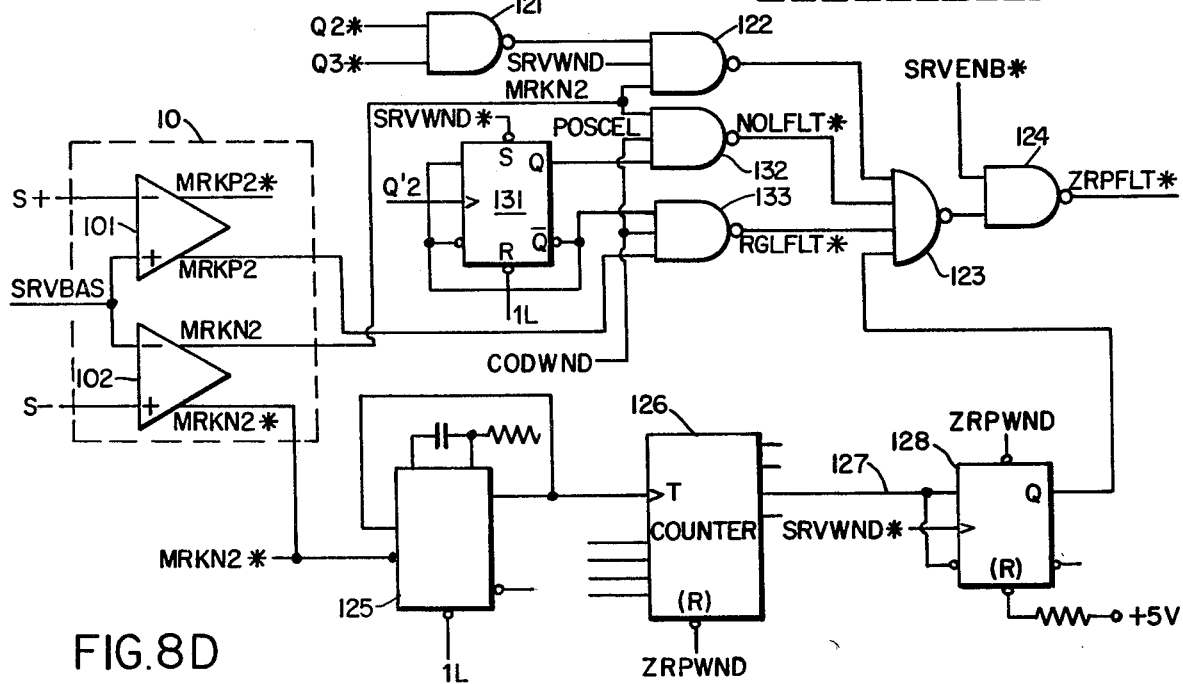

The manner in which the apparatus of the present invention senses the faults in the waveforms SRVBAS of FIGS. 9 and 10 is now described in detail in connection with FIG. 8d.

To detect an error in signal SRVBAS due to the signal having a negative amplitude in excess of threshold S− during the first or second third of each servo information position cell C1–C6, the Q2* and Q3* signals, respectively derived from the $\overline{Q}$ output terminals of flip-flops 108 and 109 (FIG. 8c), are combined in NAND gate 121, having an output that is combined in NAND gate 122 with signal SRVWND, derived from the $\overline{Q}$ output of flip-flop 104. NAND gate 122 includes a further input responsive to signal MRKN2, derived from one of the outputs of comparison amplifier 102. The output signal of NAND gate 122 is supplied to one input of NAND gate 123, having an output that is combined in NAND gate 124 with signal SRVENB* derived from the Q output of flip-flop 18. During the fourteen sector interval while signal SRVENB* is being derived, immediately after a change order from head $T_1$ to head $T_2$ or vice versa, signal SRVENB* inhibits gate 124 to prevent signals from being derived from it.

Hence, indications of erroneous signals are not provided during the 14 sectors immeditely after a head transition command. During all other intervals, however, NAND gate 124 is responsive to the output of NAND gate 123, whereby the output signal of NAND gate 124 is a negative pulse during the first and second third of each of the six servo information position cells, if the waveform SRVBAS exceeds negative threshold S— during either of these intervals. If signal SRVBAS exceeds threshold S— during the last third of each of the servo information position cells, no output pulse is derived from NAND gate 124 because NAND gate 122 is effectively disabled by the output of NAND gate 121.

Signal ZRPFLT* has a binary zero level to indicate a fault in the servo information position cells if less than four of the six cells have excursions below the negative threshold level S—. To this end, output signal MRKN2* of comparison amplifier 102 is applied to a trigger input of monostable multivibrator 124, having an output that is applied to a trigger or count input of counter 126. Counter 126 compares the number of pulses applied to it with a digital indication of the decimal number four. As long as the count stored in counter 126 is less than four, a binary one signal is derived on output lead 127 thereof. Counter 126 is reset to zero after the servo information position bits and address bits in a particular sector have all been read out in response to the trailing edge of signal ZRPWND, which is coupled to the reset (R) input of the counter from the $\overline{Q}$ output of flip-flop 105. The output of counter 126 on lead 127 is applied to J and K input terminals of flip-flop 128, which is normally biased by a positive d.c. voltage at the reset (R) input thereof so that a binary one signal is derived from the Q output of the flip-flop. The state of flip-flop 128 is read out in response to the trailing edge of signal SRVWND, which occurs after the sixth servo information position cell of a reference zone has been read out by head T, and which is coupled to the trigger input of flip-flop 128 from the $\overline{Q}$ output of flip-flop 104. The Q output of flip-flop 128 is connected to one input of NAND gate 123, whereby signal ZRPFLT is a binary zero, error indicating level in response to fewer than four excursions of waveform SRVBAS being below the threshold level S— during the six servo information position cells.

To determine if an error occurs in waveform SRVBAS during any of the eleven address cells, signals MRKP2 and MRKN2, respectively derived from output terminals of comparison amplifiers 102 and 101, are combined with signal CODWND, at the $\overline{Q}$ output of flip-flop 106, and signal Q′2 at the Q output of flip-flop 108. An error is indicated if thresholds S+ and S— are respectively exceeded during any portion of the even and odd numbered cells, i.e. at a time when the thresholds should not be exceeded.

To these ends, the Q′2 signal at the Q output of flip-flop 108 is applied to the trigger input of flip-flop 131 that is initially biased by a positive voltage applied to the reset (R) input terminal of the flip-flop. The $\overline{Q}$ output terminal of flip-flop 131 is applied to the J and K input terminals of the flip-flop. Flip-flop 131 includes a set (s) input terminal responsive to signal SRVWND*, derived from the Q output of flip-flop 104. Thereby, flip-flop 131 is unresponsive to signal Q′2 while the servo information position cells are being read out by head T. During the eleven address cells, however, flip-flop 131 is enabled because signal SRVWND has a binary one level, whereby signal POSCEL at the Q output of the flip-flop respectively has binary one and zero values during odd and even numbered address bit cells.

The signals at output terminals Q and $\overline{Q}$ of flip-flop 131 are respectively applied to inputs of NAND gates 132 and 133, enabled during the eleven address cells of each reference zone by signal CODWND, derived from the $\overline{Q}$ output of flip-flop 106. NAND gates 132 and 133 are alternately enabled and disabled in response to the outputs of flip-flop 131 so that NAND gate 133 is enabled during the even numbered address cells (C2, C4, . . . C10), while NAND gate 133 is enabled during odd numbered address cells (C1,C3,C5, . . . C11). NAND gates 132 and 133 include additional input terminals respectively responsive to signals MRKN2 and MRKP2. Thereby, while the odd numbered address cells are being read by head T, NAND gate 132 is enabled to pass the MRKN2 output of comparison amplifier 102 to the input of NAND gate 123, whereby signal ZRPFLT is a negative pulse in response to negative threshold S— being exceeded during any of the odd numbered bits. Conversely, during any even numbered address cell, NAND gate 133 is enabled to pass the MRKP2 output of comparison amplifier 101 to the input of NAND gate 123, whereby a negative pulse appears in signal ZRPFLT*, at the output of NAND gate 124. Signal ZRPFLT* is supplied to the disc memory system of which this circuitry is a part, to indicate that a fault of error has occured in the servo information position cells or address cells for the particular sector. Signal ZRPFLT* is not, however, derived during the fourteen sectors required to change from head $T_1$ to head $T_2$ because of the inhibiting action of signal SRVENB* on gate 124. Signal SRVENB* has a similar effect on signals MRKP2, MRKP2*, MRKN2 and MRKN2* which are processed into binary values for address bits by known circuitry (not shown) that forms part of the memory management system. Also, signal SRVENB* inhibits the servo control of head T.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A method of determining errors in signals derived from cells of a reference zone read by a transducer for a magnetic recording medium, the transducer normally producing a waveform that exceeds a threshold value in a particular direction only once during each cell, comprising determining whether the waveform derived by the transducer exceeds a threshold determined by the threshold value at an incorrect time during a cell of the reference zone.

2. The method of claim 1 wherein the error is derived for address bits of zones on the medium, each address bit being represented by magnetic variations in a cell, the waveform derived by the transducer in response to each address bit cell normally including a relatively constant amplitude adjusting change segment and a data segment having a peak magnitude in excess of the threshold, the peak magnitude of the data segment being in first and second opposite directions during even and odd numbered address bit cells, the cell being in error in response to the waveform having a peak magnitude in excess of the threshold in the second and first directions for the odd and even numbered cells.

3. The method of claim 1 or 2 further including adjusting the threshold value in response to a peak value of the transducer waveform immediately prior to the first address cell in a sector of a reference zone.

4. The method of claim 1 wherein the error is derived for servo positioning information for the transducer, the servo positioning information being represented by magnetic variations in a cell, the waveform derived by the transducer in response to each servo positioning information cell normally including a pair of relatively low amplitude segments undulating in the same first direction relative to an average value and a relatively large amplitude segment undulating in the second direction relative to the average value, the high amplitude segment of each cell being greater than the threshold value and occurring in a predetermined portion of each cell, and deriving an indication of the cell being in error in response to the waveform exceeding the threshold value while the low amplitude segments are normally derived.

5. The method of claim 4 further including adjusting the threshold value in response to a peak value of the transducer waveform of the servo position cells.

6. The method of claim 1 further including adjusting the threshold value in response to a peak value of the transducer waveform of a cell of the reference zone.

7. The method of claim 1 or 2 or 4 or 5 or 6 wherein a variable gain element is connected to the transducer, the determination being made in response to an output signal of the variable gain element, further comprising storing a peak value for the output signal derived by the transducer in response to initial cells of the reference zone, and in response to the stored peak value controlling the gain of the element while other cells of the reference zone are read by the transducer.

8. A method of determining errors in reading data with a magnetic head from reference zones on tracks at differing radii of a magnetic memory disc rotating at constant angular velocity, each track including at least one reference zone, each reference zone including a plurality of initial cells each having magnetic flux variations which when read by the head result in a first waveform that includes undulations enabling the head to be properly servo controlled to a position over the center of the track and a further undulation that is distinguishable from the head positioning undulations, the initial cells being followed by plural binary bit representing data cells each having magnetic flux variations which when read by the head result in a second waveform including a data representing undulation that is approximately the same amplitude as the further undulations, the undulations susceptible to having varying amplitudes as the head is positioned at different positions of the disc, comprising detecting the peak amplitude of the further undulations for one reference zone, in response to the detected peak amplitude of each further undulation setting a threshold for the further undulations of subsequently read first waveforms and for the data representing undulations of the cells of said one reference zone, and signalling that an error in a cell exists if the set threshold is exceeded by the amplitude of undulations of the first and second waveforms at incorrect times during cells of the reference zone.

9. The method of claim 8 wherein the waveform derived by the head in response to each binary bit representing data cell normally includes a relatively constant amplitude adjusting change segment and the data representing undulation having a peak magnitude in excess of the threshold, the peak magnitude of the data segment being in first and second opposite directions during even and odd numbered address bit cells, and signalling that an address cell being in error in response to the waveform having a peak magnitude in excess of the threshold in the second and first directions for the odd and even numbered cells.

10. The method of claim 9 wherein the waveform derived by the head in response to each initial cell normally includes a pair of relatively low amplitude segments undulating in the same first direction relative to an average value and a relatively large amplitude segment undulating in the second direction relative to the average value, the high amplitude segment of each initial cell being greater than the threshold value and occurring in a predetermined portion of each initial cell, and deriving an indication of the initial cell being in error in response to the initial cell waveform exceeding the threshold value while the low amplitude segments are normally derived.

11. The method of claim 8 or 9 or 10 wherein a variable gain element is connected by the head, the error being signalled in response to an output signal of the variable gain element, further comprising storing a peak value for the output signal derived by the head in response to the initial cells of the reference zone, and in response to the stored peak value controlling the gain of the element while other cells of the reference zone are read by the head.

12. Apparatus for determining if errors exist in data read with a magnetic head from reference zones on tracks at differing radii of a magnetic memory disc rotating at constant angular velocity, each track including at least one reference zone, each reference zone including a plurality of initial cells each having magnetic flux variations which when read by the head result in a first waveform that includes undulations enabling the head to be properly servo controlled to a position over the center of the track and a further undulation that is distinguishable from the head positioning undulations, the initial cells being followed by plural binary bit representing data cells each having magnetic flux variations which when read by the head result in a second waveform including a data representing undulation that is approximately the same amplitude as the further undulations, the undulations susceptible to having varying amplitudes as the head is positioned at different positions of the disc, comprising means for detecting the peak amplitude of the further undulations for one reference zone, means responsive to the detected peak amplitude of each further undulation for setting a threshold for the further undulations of subsequently read first waveforms and for the data representing undulations of the cells of said one reference zone, means for signalling that an error in a cell exists in response to the set threshold being exceeded by the amplitude of undulations of the first and second waveforms at incorrect times during cells of the reference zone.

13. The apparatus of claim 12 wherein the waveform derived by the head in response to each address bit cell normally includes a relatively constant amplitude adjusting change segment and the data representing undulation having a peak magnitude in excess of the threshold, the peak magnitude of the data segment being in first and second opposite directions during even and odd numbered address bit cells, the signalling means including means for sensing that address bit waveforms have a peak magnitude in excess of the threshold in the second and first directions for the odd and even numbered cells.

14. The apparatus of claim 12 wherein the waveform derived by the head in response to each initial cell normally includes a pair of relatively low amplitude segments undulating in the same first direction relative to an average value and a relatively large amplitude segment undulating in the second direction relative to the average value, the high amplitude segment of each initial cell being greater than the threshold value and occurring in a predetermined portion of each initial cell, said signalling means including means for deriving an indication of the initial cell being in error in response to the initial cell waveform exceeding the threshold value while the low amplitude segments are normally derived.

15. The apparatus of claim 12 or 13 or 14 further including a variable gain element connected to the head, the signalling means being responsive to an output signal of the variable gain element, means for storing a peak value for the output signal derived by the head in response to the initial cells of the reference zone, and means responsive to the stored peak value for controlling the gain of the element while other cells of the reference zone are read by the head.

16. Apparatus for determining errors in data read with a magnetic head from reference zones on tracks of a magnetic memory, each track including at least one reference zone, each reference zone including a plurality of initial cells each having magnetic flux variations which when read by the head result in a first waveform that includes undulations enabling the head to be properly servo controlled to a position over the center of the track and a further undulation that is distinguishable from the head positioning undulations, the initial cells being followed by plural binary bit representing data cells each having magnetic flux variations which when read by the head result in a second waveform including a data representing undulation that is approximately the same amplitude as the further undulations, comprising means for setting a threshold for the further undulations of the first waveforms and for the data representing undulations of the cells of a reference zone, and means responsive to the set threshold and the waveforms for signalling that an error in a cell exists in response to the set threshold being exceeded by the amplitude of undulations of the first and second waveforms at incorrect times during cells of the reference zone.

17. The apparatus of claim 16 wherein the waveform derived by the head in response to each binary bit representing data cell normally includes a relatively constant amplitude adjusting change segment and the data representing undulation having a peak magnitude in excess of the threshold, the peak magnitude of the data segment being in first and second opposite directions during even and odd numbered address bit cells, the signalling means including means for sensing that address bit waveforms have a peak magnitude in excess of the threshold in the second and first directions for the odd and even numbered cells.

18. The apparatus of claim 17 wherein the waveform derived by the head in response to each initial cell normally includes a pair of relatively low amplitude segments undulating in the same first direction relative to an average value and a relatively large amplitude segment undulating in the second direction relative to the average value, the high amplitude segment of each initial cell being greater than the threshold value and occurring in a predetermined portion of each initial cell, said signalling means including means for deriving an indication of the initial cell being in error in response to the initial cell waveform exceeding the threshold value while the low amplitude segments are normally derived.

19. The apparatus of claim 16 or 17 or 18 further including a variable gain element connected to the head, the signalling means being responsive to an output signal of the variable gain element, means for storing a peak value for the output signal derived by the head in response to the initial cells of the reference zone, and means responsive to the stored peak value for controlling the gain of the element while other cells of the reference zone are read by the head.

20. Apparatus for determining errors in signals derived from cells of a reference zone of a magnetic recording medium comprising a transducer for reading magnetic flux variations of the recording medium, the transducer normally producing a waveform that exceeds a threshold value in a particular direction only once during each cell, and means responsive to the waveform for determining whether the waveform derived by the transducer exceeds a threshold determined by the threshold value at incorrect times during cells of the reference zone.

21. The apparatus of claim 20 wherein the error is derived for address bits of zones on the medium, each address bit being represented by magnetic variations in a cell, the waveform derived by the transducer in response to each address bit cell normally including a relatively constant amplitude adjusting change segment and a data segment having a peak magnitude in excess of the threshold, the peak magnitude of the data segment being in first and second opposite directions during even and odd numbered address bit cells, the determining means including means responsive to the waveform of each cell having a peak magnitude in excess of the threshold in the second and first directions for the odd and even numbered cells.

22. The apparatus of claim 20 or 21 further including means for adjusting the threshold value in response to a peak value of the transducer waveform immediately prior to the first address cell in a sector of a reference zone.

23. The method of claim 20 wherein the error is derived for servo positioning information for the transducer, the servo positioning information being represented by magnetic variations in a cell, the waveform derived by the transducer in response to each servo positioning information cell normally including a pair of relatively low amplitude segments undulating in the same first direction relative to an average value and a relatively large amplitude segment undulating in the second direction relative to the average value, the high amplitude segment of each cell being greater than the threshold value and occurring in a predetermined portion of each cell, said determining means including means responsive to the waveform exceeding the threshold value while the low amplitude segments are normally derived.

24. The apparatus of claim 23 further including means for adjusting the threshold value in response to a peak value of the transducer waveform of the servo position cells.

25. The apparatus of claim 20 further including means for adjusting the threshold value in response to a peak value of the transducer waveform of a cell of the reference zone.

26. The apparatus of claim 20 or 21 or 23 or 24 further including a variable gain element connected to the transducer, the determining means being responsive to an output signal of the variable gain element, means for storing a peak value for the output signal derived by the transducer in response to initial cells of the reference zone, and means responsive to the stored peak value for controlling the gain of the element while other cells of the reference zone read by the transducer.

27. A method of determining errors in reading data with a magnetic head from reference zones on tracks of a magnetic memory, each track including at least one reference zone, each reference zone including a plurality of initial cells each having magnetic flux variations which when read by the head result in a first waveform that includes undulations enabling the head to be properly servo controlled to a position over the center of the track and a further undulation that is distinguishable from the head positioning undulations, the initial cells being followed by plural binary bit representing data cells each having magnetic flux variations which when read by the head result in a second waveform including a data representing undulation that is approximately the same amplitude as the further undulations, comprising setting a threshold for the further undulations of the first waveforms and for the cells of a reference zone, and signalling that an error in a cell exists if the set threshold is exceeded by the amplitude of undulations of the first and second waveforms at incorrect times during cells of the reference zone.

28. The method of claim 27 wherein the waveform derived by the head in response to each binary bit representing data cell normally includes a relatively constant amplitude adjusting change segment and the data representing undulation having a peak magnitude in excess of the threshold, the peak magnitude of the data segment being in first and second opposite directions during even and odd numbered address bit cells, the signalling that an address cell being in error in response to the waveform having a peak magnitude in excess of the threshold in the second and first directions for the odd and even numbered cells.

29. The method of claim 27 wherein the waveform derived by the head in response to each initial cell normally includes a pair of relatively low amplitude segments undulating in the same first direction relative to an average value and a relatively large amplitude segment undulating in the second direction relative to the average value, the high amplitude segment of each initial cell being greater than the threshold value and occurring in a predetermined portion of each initial cell, and deriving an indication of the initial cell being in error in response to the initial cell waveform exceeding the threshold value while the low amplitude segments are normally derived.

30. The method of claim 27 wherein a variable gain element is connected to the head, the error being signalled in response to an output signal of the variable gain element, further comprising storing a peak value for the output signal derived by the head in response to the initial cells of the reference zone, and in response to the stored peak value controlling the gain of the element while other cells of the reference zone are read by the head.

* * * * *